US005479592A

United States Patent [19]
Stenhouse

[11] Patent Number: 5,479,592
[45] Date of Patent: Dec. 26, 1995

[54] METHOD OF SIMULTANEOUSLY ANALYZING A PLURALITY OF PERFORMANCE STATISTICS OF AN ATHLETE

[76] Inventor: Michael S. Stenhouse, 18 Friendly Dr., Warwick, R.I. 02888

[21] Appl. No.: 203,818

[22] Filed: Mar. 1, 1994

[51] Int. Cl.[6] ................................................. G06T 7/00
[52] U.S. Cl. ............................................................ 395/140
[58] Field of Search ...................................... 395/140, 141, 395/155–157, 161, 650, 919, 924, 926, 927; 364/410–413.04, 578

[56] References Cited

U.S. PATENT DOCUMENTS

| 5,016,170 | 5/1991 | Pollalis et al. | 395/140 |
| 5,228,119 | 7/1993 | Mihalisin et al. | 395/140 |

*Primary Examiner*—Almis R. Jankus
*Attorney, Agent, or Firm*—Salter & Michaelson

[57] ABSTRACT

A method of determining the performance characteristics of an athlete includes the steps of defining a two-dimensional graph having a horizontal axis and a vertical axis, and plotting at least four points on the two-dimensional graph to form a rectangular performance grid. The points have coordinates (x,y) which represent individual performance statistics of the athlete. The performance characteristics of the athlete are determined by the horizontal and vertical position of the grid on the graph, and the height, width and shape of the grid. The two-dimensional performance grid simultaneously displays multiple performance statistic of the athlete and allows the viewer to simultaneously analyze multiple performance characteristics without the need to individually compare and analyze burdensome statistical numbers. Two or more performance grids are overlayed on a single graph in order to determine and compare the performance characteristics of two or more athletes.

6 Claims, 7 Drawing Sheets

METHOD OF SIMULTANEOUSLY ANALYZING A PLURALITY OF PERFORMANCE STATISTICS OF AN ATHLETE

SUMMARY OF THE INVENTION

The instant invention relates to the analysis of sports statistics and more particularly to a method of determining performance characteristics of an athlete.

Performance characteristics of professional athletes are typically determined by individual analysis of a players performance statistics. For example, in baseball, a player's offensive performance characteristics are determined by statistics such as batting average, on base percentage, and slugging percentage, and a pitcher's performance characteristics are determined by earned run average, batting average against, and strikeouts. In football, a quarterback's offensive performance characteristics are determined by completion percentage, and yards gained per pass. Heretofore, an athlete's performance statistics have always been analyzed in a one-dimensional format, i.e. an individual statistic, such as batting average, is presented in numerical form for comparison with other players. Although one-dimensional statistical analysis is effective for comparing a single aspects of a player's performance, it has been found that it is burdensome and confusing to combine or analyze multiple statistics in an attempt to represent an overall picture of a player's performance.

The instant invention provides a novel method for determining performance characteristics of an athlete comprising the steps of defining a two-dimensional graph having a horizontal axis measuring a first group of variables of play, and a vertical axis measuring a second group of variables of play, calculating predetermined performance statistics and playing factors based on the athlete's performance, and plotting four or more points on the two-dimensional graph to define a two-dimensional performance grid wherein the points have coordinates (x,y) which comprise the predetermined performance statistics and playing factors of the particular athlete. The athlete's performance characteristics are determined from the graph by determining the position (vertical and horizontal) of the grid with respect to the origin of the graph, the size (height and width) of the grid, and shape (square, tall and thin, or short and wide) of the grid, each aspect of the grid defining a different performance characteristic. The two-dimensional format of the performance grid is easily interpreted, and readily comparable with the performance grids of other athletes. The performance grid thus allows the viewer to determine, at a single glance, multiple performance characteristics of an athlete, without the need to individually compare and interpret burdensome statistical numbers. In addition, the performance grids of two or more athletes can be overlayed or plotted on the same graph in order to directly compare performance. Still further, a three-dimensional performance grid is also contemplated.

Accordingly, it is an object of the instant invention to provide a method of determining the performance characteristics of an athlete.

It is another object to provide a method of simultaneously displaying multiple statistics of an athlete.

It is still another object to provide a method of constructing a performance grid which simultaneously displays multiple statistics and performance characteristics of an athlete.

It is yet another object to provide a method of comparing performance characteristics of two or more athletes.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 17 is a three-dimensional graphical illustration of a three-dimensional performance grid.

DESCRIPTION OF THE PREFERRED EMBODIMENT

Referring now to the drawings, the method of determining the performance characteristics of athletes is illustrated in FIGS. 1–6. As will hereinafter be more fully described, the instant method of determining the performance characteristics of an athlete generally comprises the steps of defining a two-dimensional graph having horizontal and vertical axes which measure different variables of game play, calculating predetermined performance statistics and playing factors of an individual player, and plotting a plurality of predetermined points on the graph to define a two-dimensional performance grid, wherein the points have coordinates (x,y) which comprise the player's performance statistics and playing factors. The athlete's performance characteristics are determined from the graph by determining the position (vertical and horizontal) of the grid with respect to the origin of the graph, the size (height and width) of the grid, and shape (square, tall and thin, or short and wide) of the grid, each aspect of the grid defining a different performance characteristic.

Figure 1:
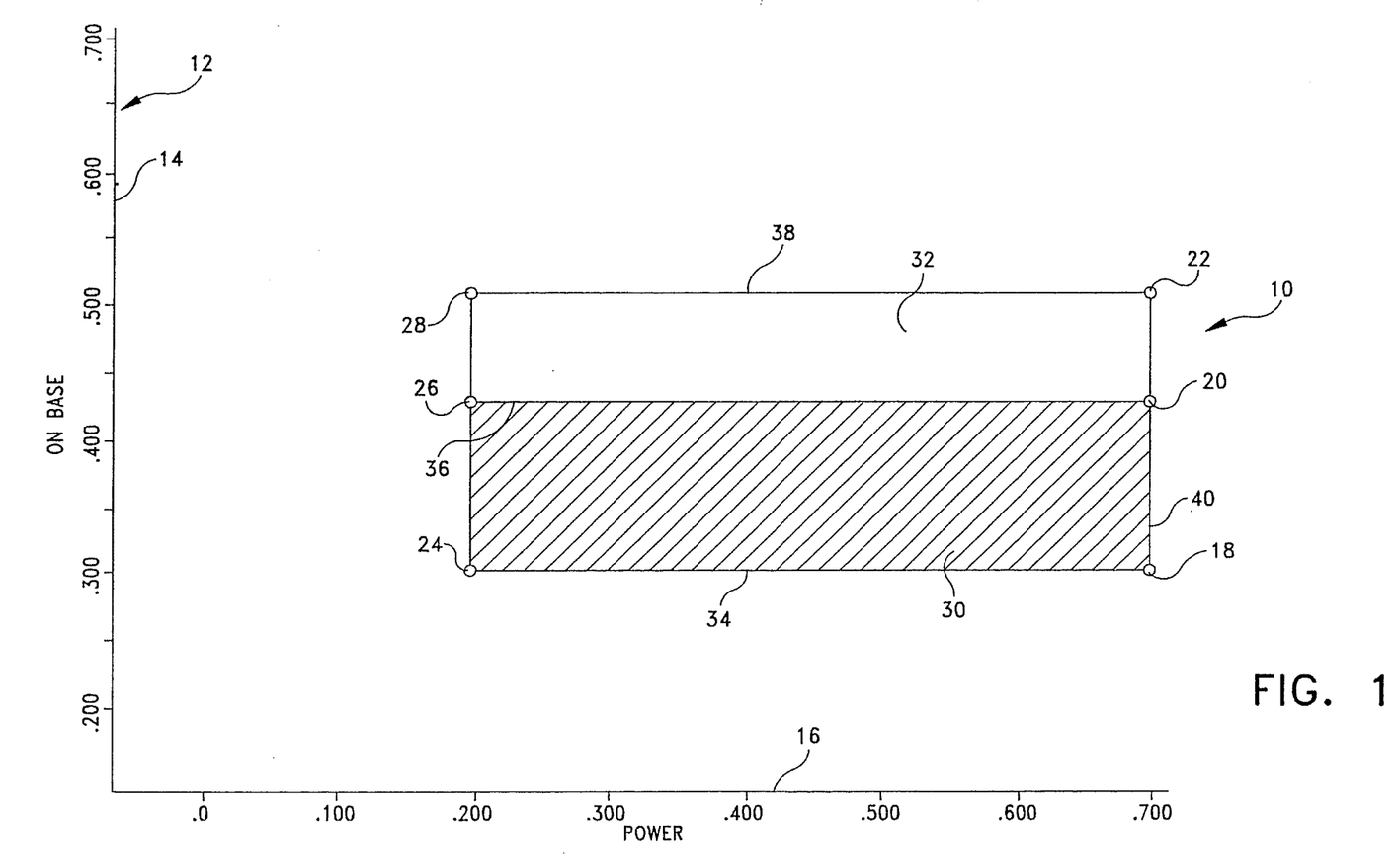
FIG. 1 is a graphical illustration of a baseball batter's performance grid.
Figure 3:
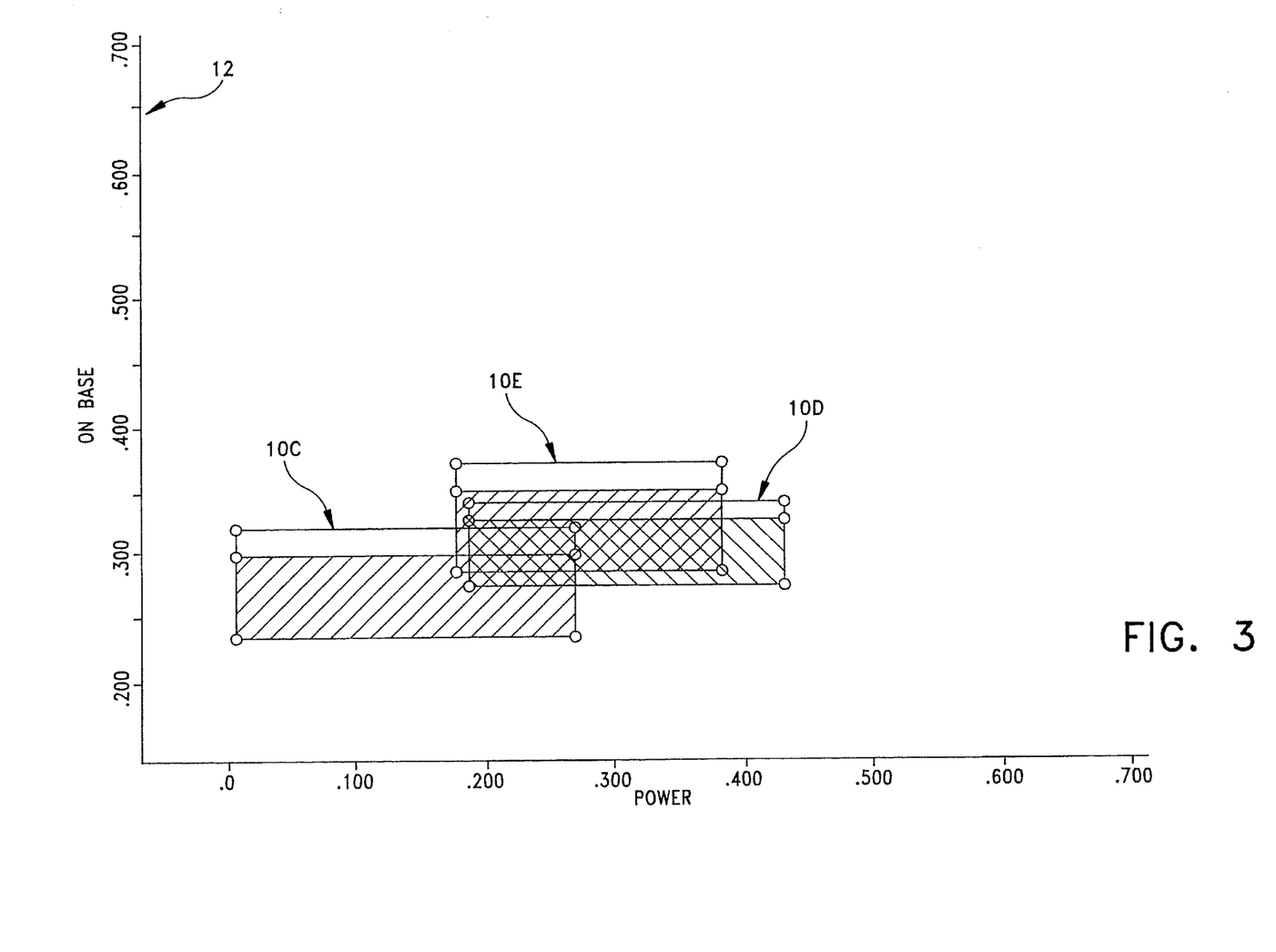
FIG. 3 is a graphical illustration of three baseball teams average performance grids overlayed for comparison.
Figure 4:
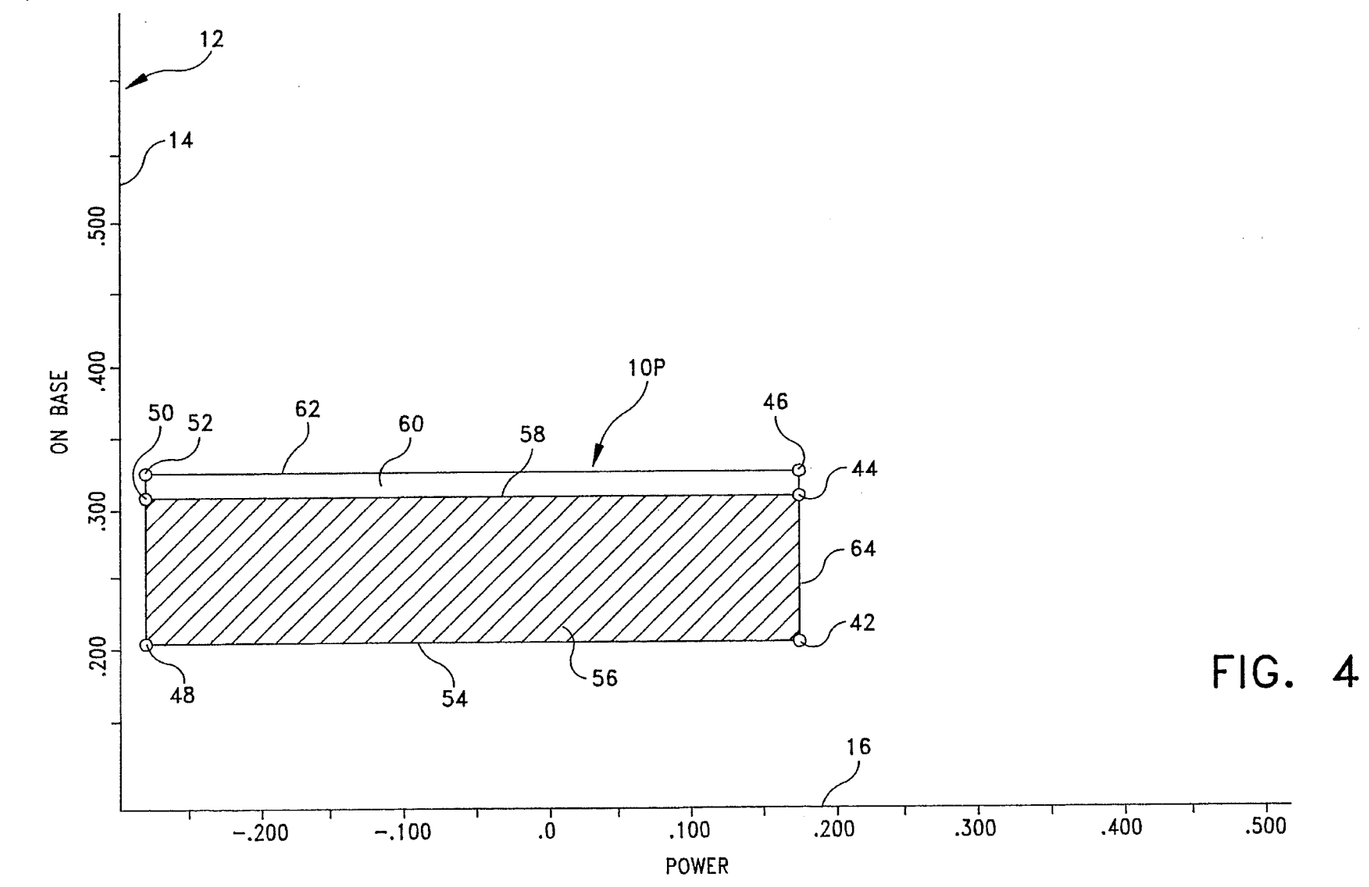
FIG. 4 is a graphical illustration of a baseball pitcher's performance grid.
Figure 5:
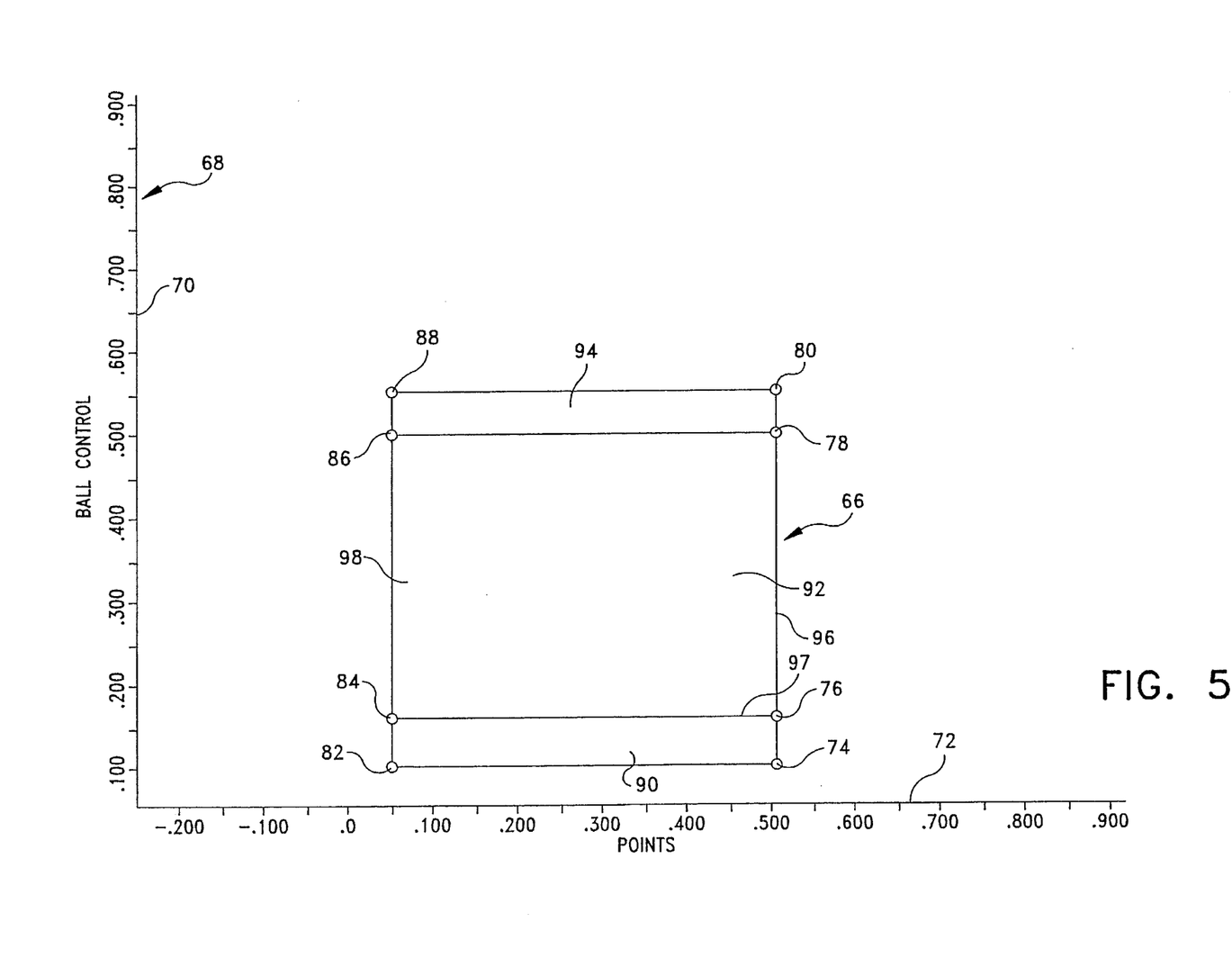
FIG. 5 is a graphical illustration of a basketball player's performance grid.
Figure 6:
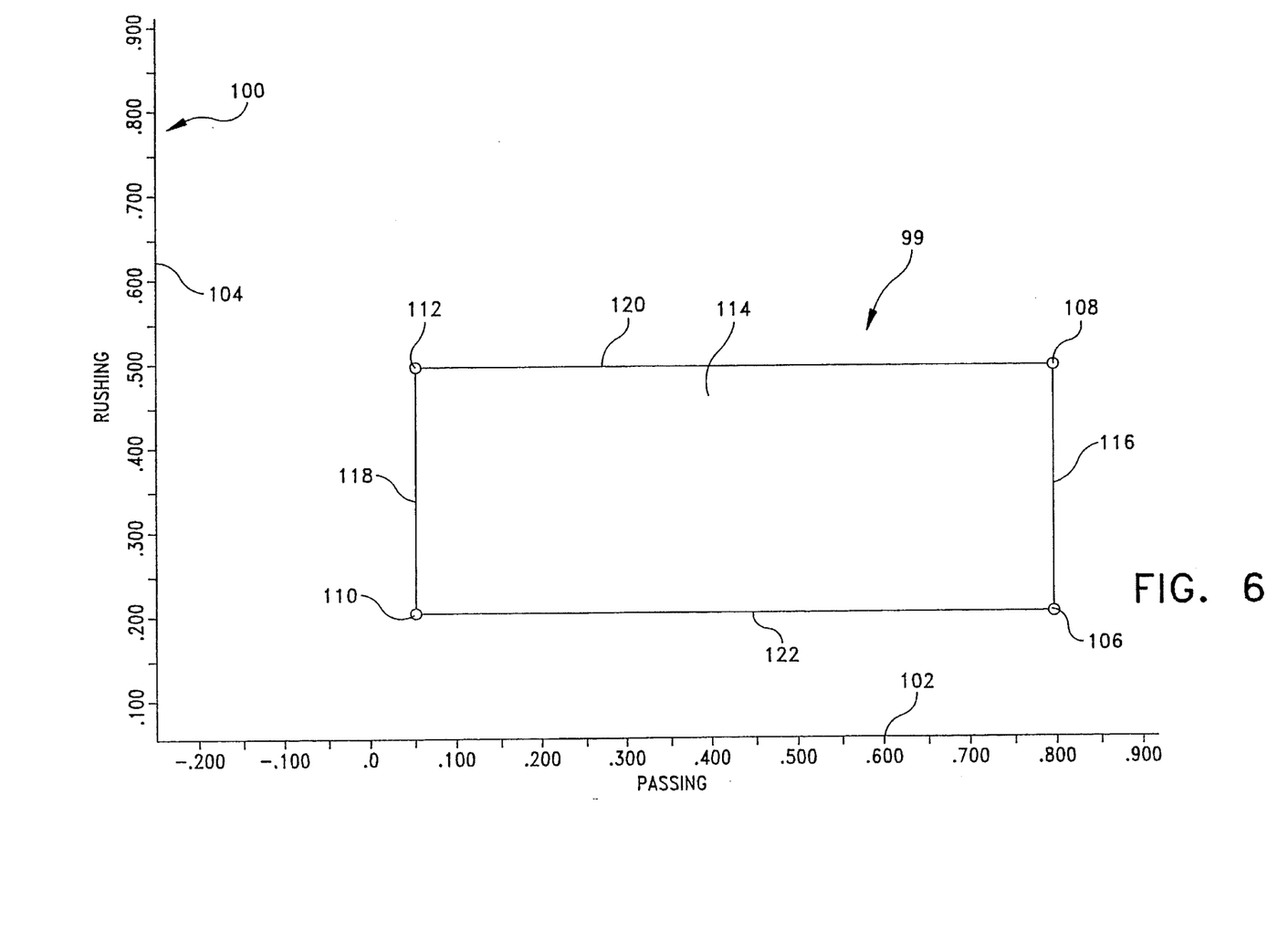
FIG. 6 is a graphical illustration of a football quarterback's performance grid.

The instant method of determining the performance characteristics of an athlete will be described in detail hereinafter in connection with the performance of a baseball batter (FIGS. 1, 2 and 3) and a baseball pitcher (FIG. 4). The performance grid of a baseball batter is generally indicated at 10 in FIG. 1 and it is plotted on a two-dimensional graph generally indicated at 12 having a vertical (y) axis 14 measuring on-base variables, i.e. the number of times the batter reaches base per number of times at bat, and a horizontal (x) axis 16 measuring power variables, i.e. the number of total bases per number of times at bat. It is noted that the vertical (y) axis 14 has a range from 0.150% to 0.700%, and that the horizontal axis (x) 16 has a range from −0.050% to 0.750%. Construction of the batter's performance grid 10 comprises calculating predetermined performance statistics and playing factors, and plotting a plurality of individual points onto the graph wherein the points have coordinates (x,y) comprising the batter's performance statistics and playing factors. More specifically, the performance grid of a baseball batter comprises six points 18, 20, 22, 24, 26, and 28 having the following coordinates:

18 (slugging average, batting average)

20 (slugging average, on base percentage)

22 (slugging average, combined-on-base percentage)

24 (slugging average minus slump factor, batting average)

26 (slugging average minus slump factor, on base percentage)

28 (slugging average minus slump factor, combined on base percentage).

Wherein the statistics are calculated as follows:

Batting Average: (hits/at bats)

On Base Percentage: (hits+walks+hit by pitch/plate appearances)

Speed Factor: (steals minus 0.5 caught stealing/plate appearance)

Combined On Base Factor: (on base percentage)+(speed factor)

Slugging Average: (total bases/at bats)

Slump Factor: 2× (strikeouts+ground into double plays)

It is pointed out that the above-referenced statistics and playing factors include predetermined weighting factors which can be altered by the user to emphasize or to de-emphasize individual performance characteristics.

The boundaries of the performance grid are defined by horizontal and vertical lines which connect the various points. The points and lines define a lower section 30 which is shaded, and an upper section 32 which is unshaded.

Referring to FIG. 1, the performance grid 10 of a baseball batter having the following statistics is illustrated:

Batting Average: 0.300

On Base Percentage: 0.410

Speed factor 0.080

Combined On Base Factor: 0.490

Slugging Percentage: 0.700

Slump Factor: 0.500

Each player's individual performance statistics and playing factors define a uniquely shaped and positioned performance grid 10 wherein the position (vertical and horizontal) of the grid 10 with respect to the origin of the grid 10 determine the tendencies and capabilities of that player. For a batter, larger coordinate values, i.e. further away from the origin of the graph 12 indicate better performance. Looking at the vertical (y) axis 14 of the graph 12 (on base percentage), three different performance characteristics of the player are determined. The bottom line 34 of the grid 10 represents the players batting average, i.e. the ability of the player to reach base by getting hits. It is readily understood that the higher the line 34 away from the origin of the graph 12, the better the average. The height of the lower shaded section 30, shows the player's propensity to reach base other than by getting a hit, such as by walking, or being hit by a pitch, and is a good indication of the player's patience at the plate. The greater the height of this section 30, the more patient the hitter. The horizontal line 36 which forms the upper boundary of the shaded section 30 thus depicts the player's on base percentages, i.e. the number of times reaching base by any means divided by plate appearances. The height of the upper unshaded section 32 shows the player's base stealing characteristics, i.e. propensity to generate offense once on base. Player's having a tall upper section 32 have good speed and base stealing capabilities. Accordingly, the upper boundary line 38 of the upper section 32 defines the player's combined on base factor. Looking at the horizontal (x) axis 16 of the graph 12 (power), two more performance characteristics are determined. The right hand boundary line 40 of the grid 10 depicts the batter's slugging average, i.e. propensity to generate power through extra base hits, (doubles, triples, home runs), while the horizontal length of the grid 10 shows the propensity of the player to strikeout or to hit into double-plays, i.e. to slump or kill rallies. The wider the grid 10 horizontally, the more volatile the hitter. A thinner horizontal dimension of the grid 10 indicates a more consistent hitter who strikes out less often. Two more performance characteristics and determined by analyzing the right-hand boundary line 40. A hit factor showing the player's total batting capability, without walks, steals or other non-batting factors is represented by the lower right point 18 of the grid 10, and an offensive threat factor representing the player's total offensive potential, not including negative factors is defined by upper right point 22 of the grid 10. The offensive threat factor is computed by adding the coordinate percentages together, i.e. 0.700 plus 0.490 equals 1.190.

Figure 2:
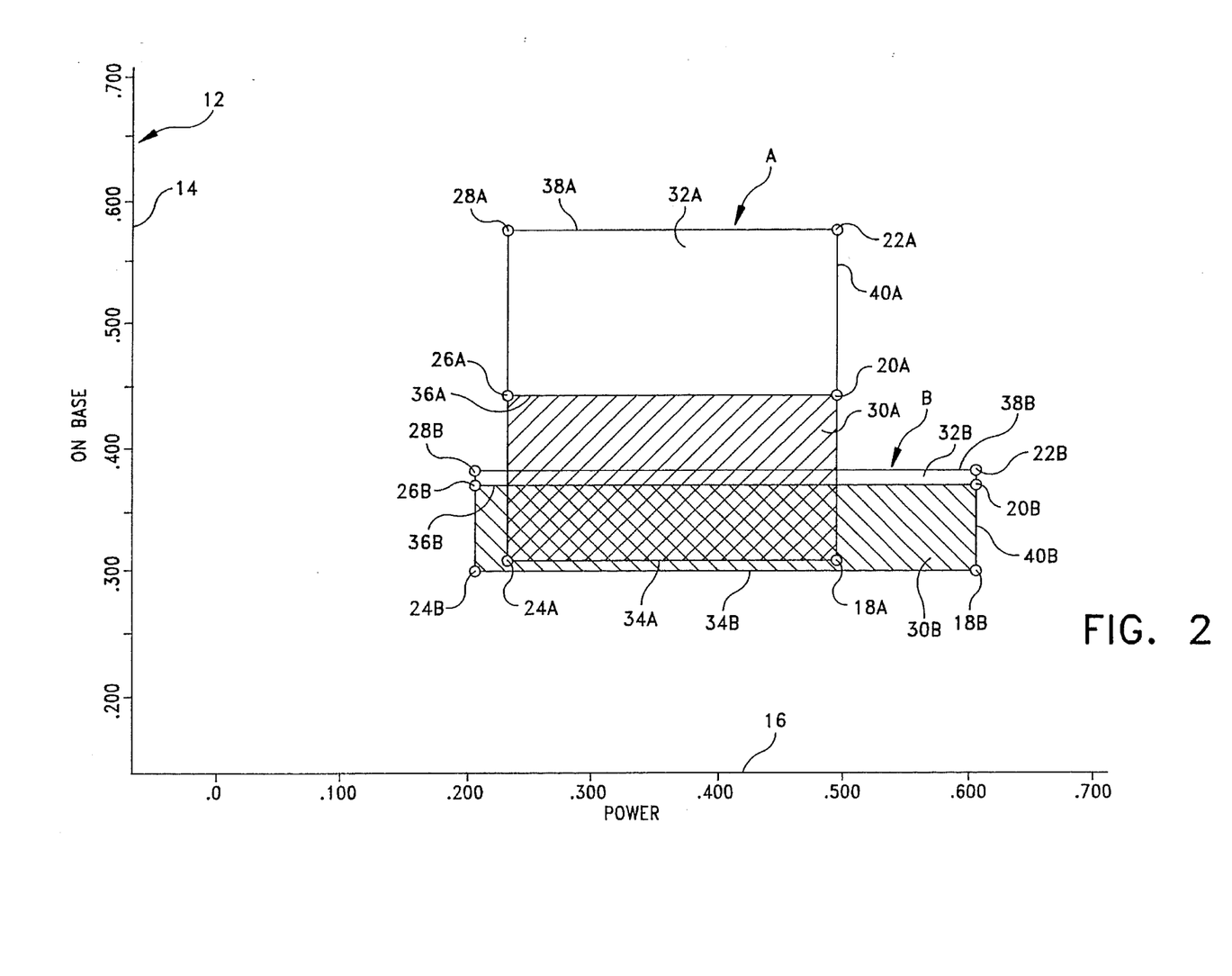
FIG. 2 is a graphical illustration of two different baseball batter's performance grids overlayed for comparison.

The instant method of determining performance characteristics, is also ideal for directly comparing the performance characteristics of two players. The performance grids 10A and 10B of two very different types of batters are illustrated in FIG. 2. In general, it can be determined that player A has a performance grid 10A which is typical of an ideal "lead off hitter". The grid 10A is tall and relatively thin, depicting high on base factors with little power and high consistency. Player B has a performance grid 10B typical of most "power hitters". The grid 10B is short and wide, depicting his propensity to generate a lot of total bases, with low on base factors and high volatility (potential to strikeout). More specifically, looking at the vertical (y) axis 14, it can be determined that player A has a slightly higher batting average than player B (comparing the bottom lines 34A and 34B of the grids 10A and 10B). Also it can be determined that A tends to walk more than B (comparing the height of the shaded lower sections 30A and 30B), and that A has a high propensity to steal bases, while B offers virtually no speed (comparing heights of upper unshaded sections 32A and 32B). Combining A's tendencies to hit for average, draw walks and to run, A has a significantly higher combined on base factor (upper line 38A of grid 10A). By studying the horizontal (x) axis 16 of the graph 12, it can be determined that B creates significantly more power offense than A by virtue of his higher slugging average (compare right hand boundary lines 40A and 40B). However B also tends to strikeout and hit into double plays more (comparing horizontal width of the grids 10A and 10B). By comparing the hit factors (points 18A and 18B) of each player, it can be determined that player B is much more of a batting threat, however, it can also be determined that the offensive threat factor of the players (A-1.050 and B-1.000) is relatively similar by comparing the position and coordinate values of points 22A and 22B of each grid. Much of A's offensive threat is created by on base factors while B's offensive threat is realized almost exclusively through power.

The following general rules can be used to determined the performance characteristics of a batter. (1) Better hitters have coordinates further away from the origin of the graph 12; (2) Better average, patient and speedy hitters have grids 10 which start or reach higher vertically; (3) Power hitters have grids 10 which extend further to the right; (4) Volatile hitters have wider grids 10 horizontally; (5) Well rounded hitters have grids 10 which are generally square in shape; and (6) Consistent hitters have grids 10 which are thinner horizontally.

The performance characteristics of entire teams, or groups of players, can also be determined by using the instant method. Referring to FIG. 3, the performance grids 10C, 10D and 10E of three different baseball teams are illustrated. For use in determining the overall performance characteristics of teams, the individual player's batting statistics and playing factors are averaged together resulting in a set of average statistics for the entire team. These sets of averages are used to construct the performance grids 10C, 10D, and 10E of the teams. The average statistics for each of the groups may be depicted on the graph 12 for easy reference.

The performance grid of a pitcher is constructed on the same graph 12 as a hitter and it comprises six points 42, 44, 46, 48, 50, and 52 having the following coordinates:

42 (slugging average against, batting average against)

44 (slugging average against, on base percentage against)

46 (slugging average against, combined on percentage against)

48 (slugging average against minus strikeout factor, batting average against)

50 (slugging average against minus strikeout factor, on base percentage against)

52 (slugging average against minus strikeout factor, combined on base percentage against).

52 (slugging average against minus strikeout factor, combined on base percentage against).

wherein the statistics are defined as follows:

Batting Average Against: (hits allowed/at bats)

On Base Percentage: (hits allowed+walks+hit by pitch/total batters faced)

Speed Factor: (steals+wild pitches+balks minus 0.5 caught stealing)/total batters faced Combined On Base Factor: (on base percentage+speed factor)

Slugging Average: (total bases allowed at bats)

Strikeout Factor: 2× (strikeouts+ground into double plays)/at bats

It is pointed out that the calculation of statistics for a pitcher also take into account certain weighted averages for emphasizing specific performance characteristics.

Referring to FIG. 4, there is illustrated the performance grid 10P of a baseball pitcher having the following statistics:

Batting Average Against: 0.200

On Base Percentage Against: 0.310

Speed Factor 0.010

Combined On Base Factor 0.320

Slugging Percentage Against: 0.210 size and shape of the grid 10P determine the tendencies and capabilities of the pitcher. Conversely to a hitter's performance grid, smaller coordinate values, i.e. closer to the origin of the graph indicate better performance. Looking at the vertical (y) or "on base" axis, three pitching performance characteristics can be determined. The bottom line 54 of the grid 10P depicts the pitcher's batting average against and shows his propensity to allow base hits. The height of the lower shaded section 56, shows the pitcher's control or wildness tendencies, i.e. the number of hit by pitches and walks allowed. Therefore, the upper line 58 of the lower section defines the pitcher's on base percentage allowed. The height of the upper unshaded section 60, shows the pitcher's tendency to allow base runners to steal or advance along the base path. Adding these factors together determines the pitcher's combined on base factors allowed depicted as the top line 62 of the grid. Looking at the horizontal (x) axis, there are two additional characteristics which can be determined. The pitcher's tendency to give up power offense, i.e. total bases per at bat is depicted by the right hand boundary line 64, while the pitcher's propensity to strike out batters and to induce grounded into double plays is represented by the horizontal width of the grid 10P. For a pitcher, a long horizontal grid represents a dynamic ability to strike out batters and to pitch out of jams. In addition, there is another significant factor that can be determined from the right-hand boundary 64 of the pitcher's grid 10P. A total offense allowed factor is represented by the upper right point 46 of the grid 10P. This point 46 depicts the pitcher's general propensity to allow the opponents to generate offense.

While the instant method was developed primarily for use in interpreting offensive and pitching statistics of baseball players, the method can easily be adapted to determine the performance characteristics of almost any athlete in any sport. Examples of performance grids for basketball and football players will also be generally described hereinafter.

A performance grid generally indicated at 66 for a basketball player (FIG. 5) is plotted on a two-dimensional graph 68 having a vertical (y) axis 70 measuring ball control variables, and a horizontal (x) axis 72 measuring scoring variables. The performance grid 66 of the basketball player comprises eight points 74, 76, 78, 80, 82, 84, 86, and 88 which define three vertical sections 90, 92, and 94. Looking at the vertical (y) axis, the height of the lower section 90 represents turnovers allowed by the player, the height of the middle section 92 depicts rebounds, and the height of the upper section 94 represents blocked shots. Looking at the horizontal (x) axis, the right hand boundary line 96 represents total points created, while the horizontal width of the grid 66 represents the propensity of the player to score from the field. Accordingly, the horizontal width of the grid 66 represents an ability to score field goals. Line 97 represents steals, and Line 98 represents free throw points.

A performance grid 99 for a football quarterback (FIG. 6) is plotted on a two dimensional graph 100 having a horizontal (x) axis 102 measuring a passing yardage variables and a vertical (y) axis 104 measuring a rushing yardage variables. The performance grid 98 comprises four points 106, 108, 110, and 112 defining a single rectangular grid 114. Looking at the horizontal (x) axis 120, the right hand boundary line 116 represents average yards per pass completed, and the left hand boundary line 118 represents average yards per pass attempt. Looking at the vertical (y) axis 104, the upper boundary line 120 represents the football team's rushing yards per team rushing play, and the lower boundary line 122 represents the quarterback's rushing yardage per team rushing play.

Figure 7:
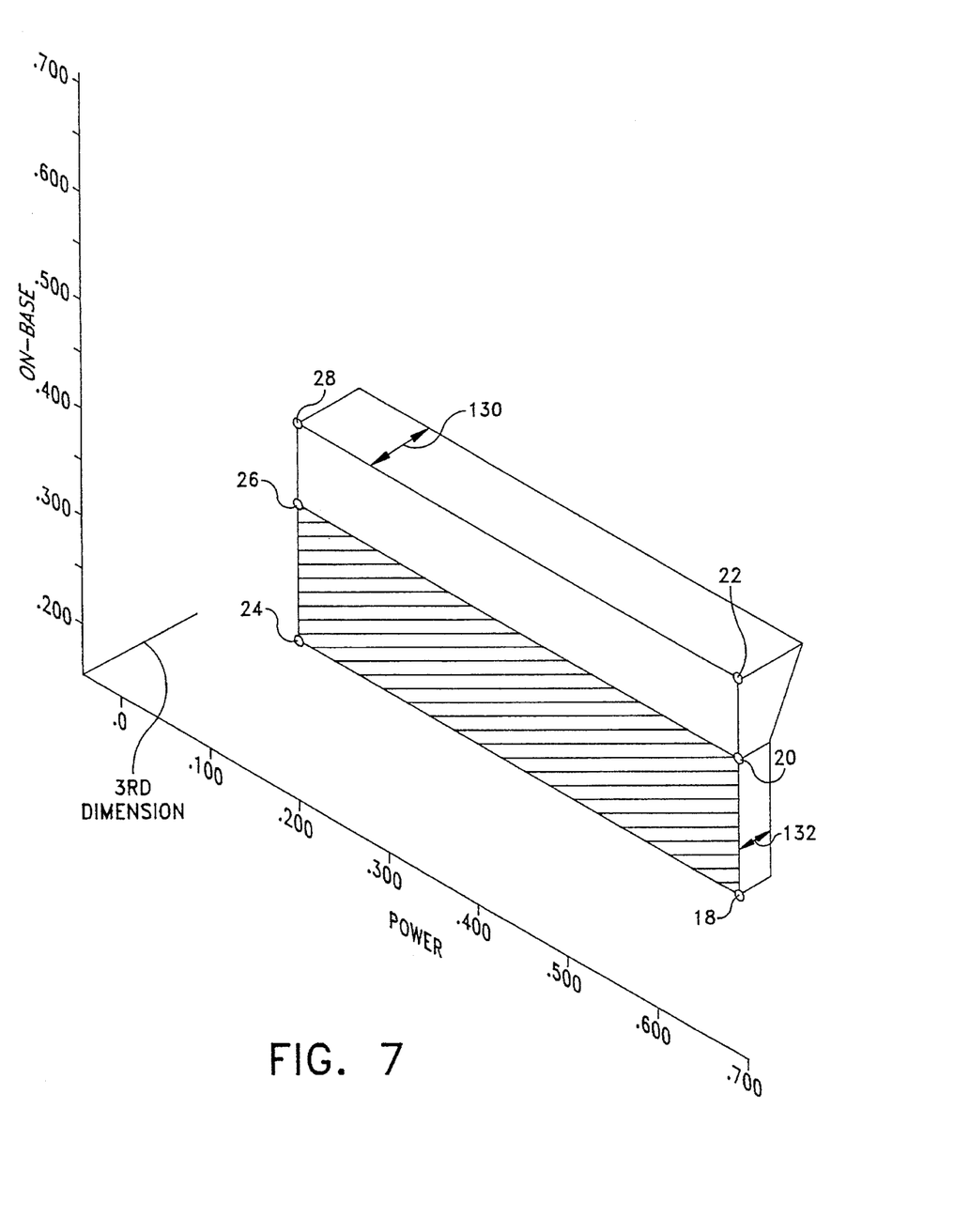

It is still further contemplated that the method of determining a baseball batter's performance can be adapted to construction of a three-dimensional grid as illustrated, by example, in FIG. 7. A third dimension factor 130 (depth) measures a correlation of how effectively the player's combined-on-base factor actually produced runs scored. Further, a second third dimension factor 132 measures a correlation of how effectively the player's slugging factors actually produced runs scored.

It can therefore be seen that the instant method is effective for determining the performance characteristics of an athlete for virtually any of the professional sports. In particular, the performance grid 10 of a baseball batter quickly and accurately gives the viewer an overall picture of the baseball player's offensive performance characteristics without having to individually compare bordersome statistical numbers and averages. The athlete's performance characteristics are quickly and easily determined from the graph by determining the position (vertical and horizontal) of the grid with respect to the origin of the graph, the size (height and width) of the grid, and shape (square, tall and thin, or short and wide) of the grid, each aspect of the grid defining a different performance characteristic. When it is desired to compare one player against another, the two player's performance grids 10 are overlayed on a single graph 12 for direct comparison. The instant method can further be utilized to compare the performance characteristics of baseball pitchers. Still further, the method is readily adaptable for use in analyzing and determining the performance characteristics of both basketball and football players. While the sport of hockey has not been mentioned in the instant specification, it is to be understood that the instant method is also applicable to hockey players. For these reasons, the instant invention is believed to represent a significant advancement in the determination of performance characteristics which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. A method of simultaneously analyzing a plurality of performance statistics and playing factors of an athlete comprising the steps of:

defining a two-dimensional graph having a vertical (y) axis measuring a first variable of play and a horizontal (x) axis measuring a second variable of play;

calculating a plurality of predetermined performance statistics and playing factors for said athlete;

constructing a rectangular performance grid on said graph, said performance grid being defined by four corner points, said four corner points being defined by pairs of coordinates comprising selected performance statistics and playing factors of said athlete, said step of constructing said performance grid comprising the step of plotting said four points at positions on said graph corresponding to said coordinates; and simultaneously analyzing the positions of the points of the grid with respect to an origin of the graph, and further simultaneously analyzing the height, width and shape of the grid, wherein said positions, said height, said width, and said shape of said grid simultaneously represent a different performance characteristic of said athlete.

2. A method of simultaneously analyzing a plurality of performance statistics and playing factors of an athlete comprising the steps of:

defining a two-dimensional graph having a vertical (y) axis measuring a first variable of play and a horizontal (x) axis measuring a second variable of play;

calculating a plurality of predetermined performance statistics and playing factors for said athlete;

constructing a multi-sectioned rectangular performance grid on said graph, said multi-sectioned rectangular performance grid being defined by six points wherein four of said points define the corners of said grid and two of said points define intermediate points along the vertical sides of said rectangular grid, each of said points being defined by a pair of coordinates comprising selected performance statistics and playing factors of said athlete, said intermediate points having a common vertical coordinate (y) so as to divide said rectangular grid into upper and lower sections, said step of constructing said performance grid comprising the step of plotting said points at positions on said graph corresponding to said coordinates; and simultaneously analyzing the positions of the points of the grid with respect to an origin of the graph, the height, width and shape of the grid, and the height, width and shape of the upper and lower sections of the grid, wherein said positions, said height, said width, and said shape of said grid and said grid sections each determine a different performance characteristic of said athlete.

3. A method of simultaneously analyzing a plurality of offensive performance statistics and playing factors of a baseball batter comprising the steps of:

defining a two-dimensional graph having a vertical (y) axis measuring a plurality of on base variables and a horizontal (x) axis measuring a plurality of power variables;

calculating a plurality of predetermined performance statistics and playing factors for said baseball batter;

constructing a multi-sectioned rectangular performance grid on said graph, said grid being defined by six points wherein four of said points comprise corner points of said grid and two of said points define intermediate points along vertical sides of said rectangular grid, said points being defined by pairs of coordinates (x,y) comprising selected performance statistics and playing factors of said hitter, said points comprising:

a first point having the coordinates (slugging average, batting average), a second point having the coordinates (slugging average, on base percentage), a third point having the coordinates (slugging average, combined on base percentage), a fourth point having the coordinates (slugging average minus slump factor, batting average), a fifth point having the coordinates (slugging average minus slump factor, on base percentage), and a sixth point having the coordinates (slugging average minus slump factor, combined on base percentage);

said second and fifth points having a common vertical coordinate so as to divide said rectangular grid into upper and lower sections, said step of constructing said performance grid comprising the step of plotting said points at positions on said graph corresponding to said coordinates; and simultaneously analyzing the positions of the points of said grid with respect to the origin of the graph, and further simultaneously analyzing the height, width and shape of the grid as defined by points one, three, four, and six, the height of the lower section defined by points one, two, four and five; and the height of the lower section defined by points two, three, five and six, wherein said positions of said points on said grid, said height and width of said grid, said shape of said grid, said height of said lower section, and said height of said upper section simultaneously represent a different performance characteristic of said baseball hitter.

4. The method of claim 3 further comprising the steps of:

connecting points one, three, four and six with horizontal and vertical boundary lines; and connecting points two and five with a horizontal line.

5. A method of simultaneously analyzing a plurality of pitching performance statistics and playing factors of a baseball pitcher comprising the following steps:

defining a two-dimensional graph having a vertical (y) axis measuring a plurality of on base variables and a horizontal (x) axis measuring a plurality of power variables;

calculating a plurality of predetermined performance statistics and playing factors for said baseball pitcher;

constructing a multi-sectioned rectangular performance grid on said graph, said grid being defined by six points wherein four of said points define the corners of said grid and two of said points define intermediate points along the vertical sides of said rectangular grid, said points being defined by pairs of coordinates (x,y) comprising selected performance statistics and playing factors of said pitcher, said points comprising:

a first point having the coordinates (slugging average against, batting average against), a second point having the coordinates (slugging average against, on base percentage against), a third point having the coordinates (slugging average against, combined on base percentage against), a fourth point having the coordinates (slugging average against minus strikeout factor, batting average against), a fifth point having the coordinates (slugging average against minus strikeout factor, on base percentage against), and a sixth point having the coordinates (slugging average against minus strikeout factor, combined on base percentage against), said second and fifth points having a common vertical coordinate so as to divide said rectangular grid into upper and lower sections, said step of constructing said performance grid comprising the step of plotting said six points at positions on said graph corresponding to said coordinates; and simultaneously analyzing the positions of the points of said grid with respect to the origin of the graph, and further simultaneously analyzing the height, width and shape of the entire grid defined by points one, three, four, and six, the height of a first section defined by points one, two, four and five, and the height of a second section defined by points two, three, five and six, wherein said positions of said points of said grid, said height and width of said grid, said shape of said grid, said height of said first section, and said height of said second section each simultaneously represent a different performance characteristic of said baseball pitcher.

6. The method of claim 5 further comprising the steps of:

connecting points one, three, four and six with horizontal and vertical boundary lines; and connecting points two and five with a horizontal line.

* * * * *